United States Patent [19]

Fague et al.

[11] Patent Number: 5,768,317
[45] Date of Patent: Jun. 16, 1998

[54] EQUALIZATION FILTER COMPENSATING FOR DISTORTION IN A SURFACE ACOUSTIC WAVE DEVICE

[75] Inventors: Daniel E. Fague, Sunnyvale; Gerard G. Socci, Palo Alto; Benny Madsen, Santa Clara, all of Calif.

[73] Assignee: National Semiconductor Corporation, Santa Clara, Calif.

[21] Appl. No.: 436,678

[22] Filed: May 8, 1995

[51] Int. Cl.$^6$ .................... H04L 25/49; H04L 27/20
[52] U.S. Cl. .................... 375/296; 375/308; 332/103
[58] Field of Search .................... 375/266, 281, 375/284, 285, 296, 308; 332/103; 333/150–151, 154, 164–167; 364/724.01; 455/63

[56] References Cited

U.S. PATENT DOCUMENTS

| | | | |
|---|---|---|---|
| 4,358,853 | 11/1982 | Qureshi | 375/296 |
| 4,700,364 | 10/1987 | Miyazaki et al. | 375/303 |
| 4,757,519 | 7/1988 | Collison et al. | 375/296 |
| 5,113,414 | 5/1992 | Karam et al. | 375/296 |
| 5,379,242 | 1/1995 | Rose et al. | 364/724.01 |
| 5,404,378 | 4/1995 | Kimura | 375/296 |
| 5,412,352 | 5/1995 | Graham | 375/308 X |
| 5,412,691 | 5/1995 | Ginzburg et al. | 375/296 |
| 5,489,879 | 2/1996 | English | 375/296 X |
| 5,512,865 | 4/1996 | Fague | 375/308 X |

OTHER PUBLICATIONS

"Personal Handy Phone System," RCR Standard, Version 1, RCR STD–28, Dec. 20, 1993, pp. 29–31.

Bjorn Bjerede et al., An Intermediate Frequency Modulator using Direct Digital Synthesis Techniques for Japanese Personal Handy Phone (PHP) and Digital European Cordless Telecommunications (DECT), 1994 IEEE, pp. 467–471.

Yoshihiko Akaiwa, "Digital Modulation/Demodulation Techniques for Mobile Radio Communications in Japan," IEICE Transactions, vol. E 74, No. 6 Jun. 1991, pp. 1503–1511.

Dr. Kamilo Feher, Ph.D, "Bandlimited Baseband Systems," Digital Communications Satellite/Earth Station Engineering, 1983 by Prentice–Hall Inc. Englewood Cliffs, NJ 07632, pp. 91–115, 162–174, 200–201.

LMX2411 Baseband Processor For Radio Communications, National Semiconductor Corporation, Sep. 1993, pp. 1–8.

LMX2410 Baseband Processor for Radio Communications, National Semiconductor Corporation, Mar. 1993, pp. 1–16.

*Primary Examiner*—Young T. Tse
*Attorney, Agent, or Firm*—Skjerven, Morrill, MacPherson, Franklin & Friel; Brian D. Ogonowsky

[57] ABSTRACT

The preferred embodiment improves the modulation accuracy of a communication system having a surface acoustic wave (SAW) device filtering a modulated signal. An equalizer filter is used to predistort the signal to be filtered so as to equalize the SAW filter response. In the preferred approach, the equalizer also provides baseband filtering. In this particular embodiment, the original baseband filter impulse response is convolved with the inverse of the actual SAW filter impulse response. The resulting values provide the coefficients for a digital filter (i.e., a modified baseband filter) forming part of a DQPSK modem. When the signal filtered by the modified baseband filter is then up-converted and filtered by the SAW filter, the predistortion caused by the modified baseband filter equalizes the SAW filter distortion, and only the modulation errors of the original baseband filter occur. In other embodiments, the equalizer filter characteristics are derived solely from the SAW filter impulse response or frequency response to equalize any distortion resulting from the SAW filter. In the preferred embodiment, the coefficients for the digital filter are stored in a ROM lookup table.

27 Claims, 3 Drawing Sheets

EQUALIZATION FILTER COMPENSATING FOR DISTORTION IN A SURFACE ACOUSTIC WAVE DEVICE

FIELD OF THE INVENTION

This invention relates to communication systems, and, in particular, to a communication system using a surface acoustic wave (SAW) device as a filter.

BACKGROUND OF THE INVENTION

In many types of communication systems processing high frequency analog signals, a surface acoustic wave (SAW) device is used as a bandpass filter to remove undesired components of the analog signal. Such SAW devices are well known and basically consist of a monolithic substrate with a piezoelectric layer having a pattern of electrodes formed thereon. Electrical signals coupled to an input electrode generate elastic surface waves, or acoustic signals, through or across the substrate. By action of the substrate and the electrode pattern, the acoustic signals contain only the frequency components desired to be passed by the SAW device. These acoustic signals are then converted back into electrical signals on an output electrode. The characteristics of the SAW filter may be selected such that the SAW filter only attenuates frequencies of electrical signals above and below a narrow frequency band. Such bandpass SAW filters are commercially available and have a variety of electrical characteristics. Such SAW filters are well known to those skilled in the art, and additional background information and representative embodiments of SAW filters may be found in U.S. Pat. Nos. 4,471,255; 4,647,881; 4,683,395; and 4,803,449, all incorporated herein by reference.

SAW filters, being essentially a mechanical structure, inherently introduce some distortion into the signal. Such SAW filters, however, have found widespread use due to their simplicity, relatively low cost, high power handling capability, and low loss.

FIG. 1 is a functional diagram of a prior art transceiver for a cordless telephone described in the paper entitled, "An Intermediate Frequency Modulator Using Direct Digital Synthesis Techniques for a Japanese Personal Handy Phone (PHP) and Digital European Cordless Telecommunications (DECT)," by Bjorn Bjerede et al., published June 1994, IEEE Vehicular Technology Conference, Stockholm, Sweden, pages 467–471, incorporated herein by reference.

The transceiver of FIG. 1 is a quadrature phase shift keying (QPSK) system which modulates a baseband QPSK signal to approximately 1.9 GHz for transmission and also demodulates a received signal. The particular system used in FIG. 1 is a differential QPSK system, also referred to as π/4-DQPSK. In DQPSK, the carrier frequency phase is shifted by multiples of π/4 every symbol time to reduce amplitude fluctuations to 50%, thus allowing power amplifiers to be run with higher efficiencies (i.e., closer to saturation). The generation of a DQPSK signal is described in the paper, "Digital Modulation/Demodulation Techniques for Mobile Radio Communications in Japan," by Y. Akaiwa, IEICE Transactions, Volume E 74, No. 6, June 1991, pages 1503–1511, incorporated herein by reference.

In FIG. 1, an input data stream, such as in NRZ format, is applied to an input terminal 10 of a digital modem 12. The modem 12 converts the serial data stream into I and Q data streams by serial-to-parallel conversion of the data stream followed by differential encoding to convert the parallel bits to the I and Q signals. Such conversion to I and Q signals is in accordance with the Personal Handy Phone System RCR Standard-28, incorporated herein by reference. Such processing is performed by the I/Q processor 14.

A local oscillator 16 provides sine and cosine intermediate frequency signals to multiplier 18 for multiplication with the I and Q data, respectively. In the system of FIG. 1, multiplier 18 digitally up-converts the complex baseband signal onto a 1.152 MHz IF carrier.

Details of such quadriphase modems are well known, and additional background information may be found in the book entitled "Digital Communications," by Dr. Kamilo Feher, Chapter 4.7.1, published by Prentice-Hall, Inc., 1983, incorporated herein by reference.

The modulated digital signal output from modem 12 is then converted to an analog signal by digital-to-analog converter (DAC) 20. The signal is then passed through a bandpass filter 22 to obtain a modulated 10.752 MHz IF signal.

A local oscillator 24 output is then multiplied by the filtered signal, using multiplier 26, to generate an up-converted IF signal. A reference frequency on line 28 is provided to local oscillator 24 and suitably multiplied to obtain the local oscillator frequency. The output of multiplier 26 is applied to the input of a SAW bandpass filter 30, which is tuned to a frequency of 248.452 MHz so as to pass a narrow band of frequencies to multiplier 32.

An RF generator 34 applies a frequency of approximately 1.65 GHz to a second input of multiplier 32. A reference frequency is applied to line 35 and used to create the RF frequency carrier. The resulting RF signal outputted from multiplier 32 is suitably amplified by amplifier 36 for transmission.

Similar components are used in the receiving end of the transceiver for suitably demodulating the received signal. These components include multiplier 40, SAW bandpass filter 42, multiplier 44, and bandpass filter 46.

In the system of FIG. 1, the SAW bandpass filter 30 is used to remove undesired artifacts of the conversion, such as the local oscillator 24 frequency and signal images. The SAW filter 30 causes distortion in the transmit signal, thus worsening modulation accuracy (i.e., increasing the RMS error vector magnitude (EVM)).

What is needed is a technique for reducing the distortion in a transmitted signal caused by a SAW filter.

SUMMARY

The preferred embodiment improves the modulation accuracy of a communication system incorporating a SAW filter by predistorting the signal to be filtered so as to equalize the SAW filter response. In the preferred approach, the communication system of FIG. 1 is modified to provide the DQPSK modem with an equalizer which not only provides baseband filtering but also equalizes the SAW filter's response to effectively cancel out any distortion by the SAW filter. In this particular embodiment, the original baseband filter impulse response is convolved with the inverse of the actual SAW filter impulse response. This may also be performed in the frequency domain. The resulting values provide the coefficients for a digital filter (i.e., a modified baseband filter) forming part of the DQPSK modem. When the signal filtered by the modified baseband filter is then up-converted and filtered by the SAW filter, the predistortion caused by the modified baseband filter equalizes the SAW filter distortion, and only the modulation errors of the original baseband filter occur.

In other embodiments, the equalizer filter characteristics are derived solely from the SAW filter impulse response or frequency response to equalize any distortion resulting from the SAW filter.

In the preferred embodiment, the coefficients for the digital filter are stored in a ROM lookup table. The ROM stores the particular filter characteristics necessary for equalizing the response of one or more commercially available SAW filters. The user then selects the particular filter response needed. In another embodiment, a RAM is programmed with the particular filter response needed once a particular SAW filter is chosen.

This concept may be applied to other systems using a SAW filter.

DETAILED DESCRIPTION OF THE PREFERRED EMBODIMENTS

Figure 1:
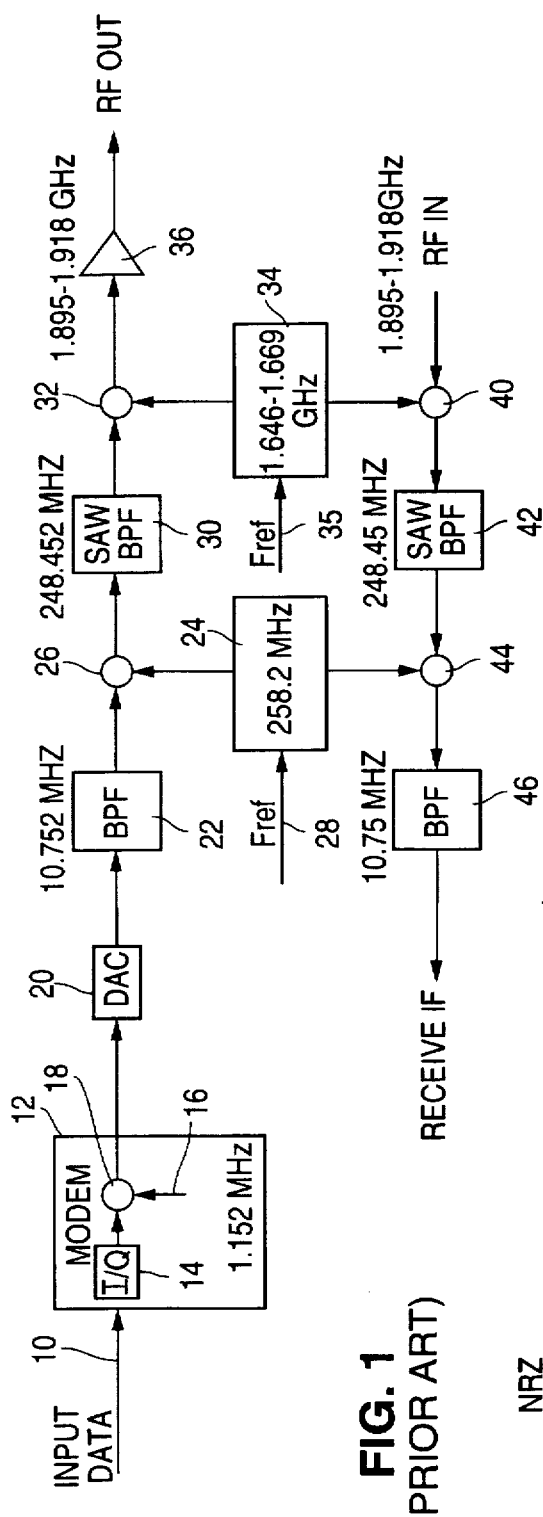
FIG. 1 is a functional diagram of a prior art communication system.
Figure 2:
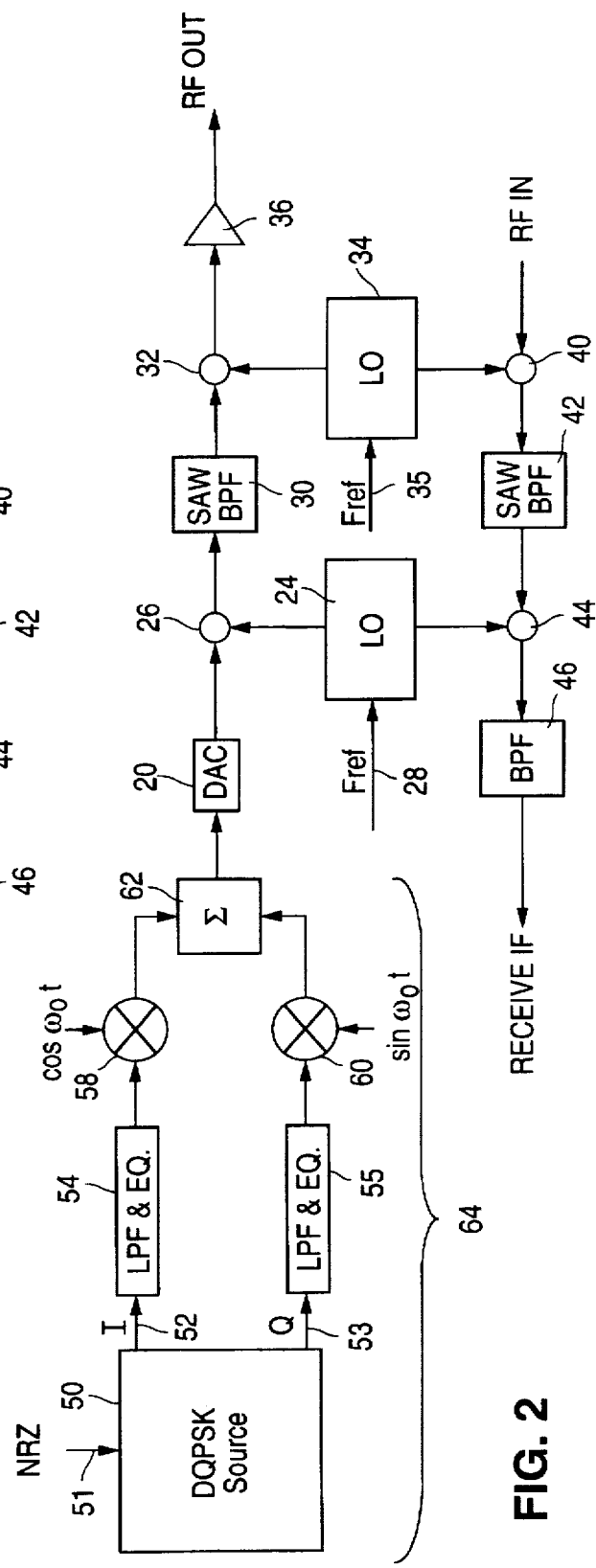
FIG. 2 is the communication system of FIG. 1 modified in accordance with the present invention, incorporating a digital filter for equalizing at least a portion of the SAW filter characteristics.

FIG. 2 is a functional diagram of one embodiment of the invention used to improve the prior art DQPSK communication system of FIG. 1. Elements in FIG. 2 identified with the same numerals as in FIG. 1 are like elements which perform like functions and will not be again described in detail.

In FIG. 2, a conventional DQPSK source 50 receives a NRZ data stream at its input 51 and provides complex I and Q (di-bit) baseband data at its outputs 52 and 53 in accordance with the RCR standard-28 previously mentioned. DQPSK source 50 may also be a state machine ROM, such as that described in U.S. Pat. No. 5,379,242, entitled "ROM Filter," by Dennis Rose and Daniel Fague, incorporated herein by reference. In one embodiment, the NRZ data is provided at 384 kbps. An I symbol and a Q symbol may contain more than one bit each. For example, the I and Q symbols may be three bits each as described in U.S. Pat. No. 5,379,242, entitled "ROM filter."

The I data is applied to an input of a combined low pass/equalization digital filter 54. The Q data is applied to an identical filter 55. The low pass filter aspects of filters 54 and 55 may provide a raised cosine roll-off characteristic, as required by the Nyquist criterion for removing inter-symbol interference. The requirements for such Nyquist filtering are well known. In the preferred embodiment, the low pass filter aspects of filters 54 and 55 provide a square root raised cosine roll-off characteristic so that matched filters may be used in the receiver. The desired filtering could also be done at a later stage by a bandpass filter.

In addition to providing low pass filtering, filters 54 and 55 also pre-distort the I and Q signals to compensate for distortion by the actual SAW filter 30. SAW filter 30 was discussed previously in detail. The creation of filters 54 and 55 will be discussed later. Filters 54 and 55 are clocked by an oversampling clock to provide 4x, 8x, or greater oversampling.

The output of filter 54 is applied to an input of multiplier 58, which has a cosine wave applied to a second input. The output of filter 55 is applied to an input of multiplier 60, which has a sine wave applied to a second input. The modulated I and Q signals output by multipliers 58 and 60 will now be out of phase by 90°. In one embodiment, the frequency of the modulated signal is 1.2 MHz. In another embodiment, the frequency is 2.4 MHz. A phase-locked loop circuit is used to generate the sine and cosine waves.

The outputs of multipliers 58 and 60 are applied to the inputs of an adder 62, which adds the signals together. The adder 62 provides the output of the digital modem 64.

The output of adder 62 is applied to a digital-to-analog converter 20, whose analog output is then applied to the input of multiplier 26 for up-converting the signal. Note that the bandpass filter 22 in FIG. 1 is eliminated from the system of FIG. 2 since this filtering is no longer needed. The equalization filtering performed by filters 54 and 55 and the bandpass filtering by SAW filter 30 provide all the necessary filtering.

The modulated signal output from the multiplier 26 is then applied to the input of a conventional SAW bandpass filter 30 for attenuating frequencies outside of a narrow band to be passed by the SAW filter 30. These attenuated frequencies include the local oscillator 24 frequency. The remainder of the components in FIG. 2 may be identical to those shown in FIG. 1 and will not be described further.

The characteristics of the filters 54 and 55 introduce predistortion into the signal ultimately applied to the input of SAW filter 30 such that the distortion by the particular SAW filter 30 used is canceled out by the predistortion introduced by filters 54 and 55.

In the embodiment of FIG. 2, the filter characteristics of filters 54 and 55 are determined as follows. The original low pass baseband filter (i.e., Nyquist filter) impulse response, b(t), is convolved with the inverse of the SAW filter 30 impulse response, h'(t). In the preferred embodiment, the inverse of the SAW filter 30 impulse response, h'(t), is generated by determining $1/H_S(f)$, where $H_S(f)$ is the SAW filter 30 frequency response. A conventional filter design program is then used to convert the inverse frequency response to the inverse impulse response (using inverse FFTs) and performs the convolution. One such program is the Filter Design System (FDS) in The Alta Group's (a subsidiary of Cadence Design Systems, Inc.) Signal Processing Worksystem (SPW). The convolution may also be performed in the frequency domain with the results converted into an impulse response to generate the filter coefficients. The FDS program has such a capability.

The convolution of the original baseband filter impulse response with the inverse of the SAW filter 30 impulse response results in a modified baseband filter impulse response, b'(t), which equals b(t)*h'(t). The modified baseband filter impulse response, b'(t), defines the characteristics of filters 54 and 55. When the modified baseband filter impulse response, b'(t), is convolved with the SAW filter 30 impulse response, h(t), the result is the original baseband filter response, b(t), and only the modulation errors of b(t) occur.

The low pass filter response of filters 54 and 55 is the dominant response of filters 54 and 55, but the predistortion due to the inclusion of the inverse impulse response of SAW filter 30 is reflected in the signals passed by filters 54 and 55. When the predistorted signals modulated by the local oscillator 24 frequency are later applied to SAW filter 30, SAW filter 30 will remove the local oscillator frequency, and the predistortion of the incoming signal will be effectively cancelled by the opposite distortion introduced by SAW filter 30.

In practice, only a portion of the SAW filter 30 response is equalized, and so when the modified baseband filter impulse response, b'(t), of filters 54 and 55 is convolved with the SAW filter 30 impulse response, h(t), the result will not produce the original b(t), but will produce some other response, b"(t), equal to b(t)*e(t), where e(t) is some small error function that produces some finite error vector magnitude in excess of the RMS error vector magnitude (EVM) of b(t). In the preferred embodiment of the invention, the −20 dB bandwidth of SAW filter 30 is considered sufficient for the equalization band.

The filters 54 and 55 may also be located downstream from (i.e., to the right of) the modem 64 and have bandpass filter characteristics instead of low pass characteristics.

Figure 3:
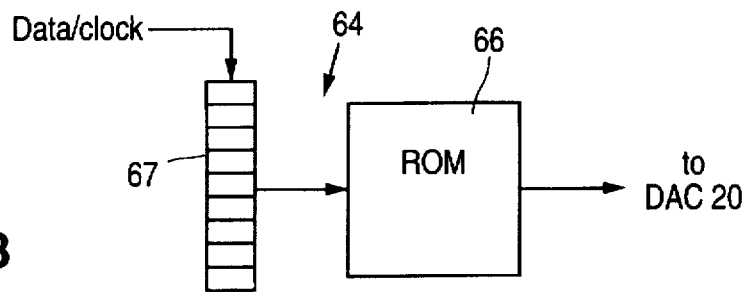
FIG. 3 illustrates the DQPSK modulator shown in FIG. 2 being formed as a ROM look-up table.

FIG. 3 illustrates the DQPSK digital modem 64 in FIG. 2 as a ROM look-up table 66 using the NRZ data and clock as an address. Shift register 67 acts as a serial-to-parallel converter for six symbols (or any other number of symbols) and three clock bits (8x oversampling). The term symbols is used rather than bits since the data may use groups of bits to convey magnitudes of other than 0 and 1, each group of bits constituting a symbol. Any number of clock bits (including zero) may be used, depending on the desired sampling rate. Each new data symbol and each new clock bit causes ROM 66 to output a corresponding filtered value. The values stored in ROM 66 are those values which would be output by modem 64 in FIG. 2 for each clock cycle, assuming the I and Q data were 8x oversampled. Thus, the filtering performed by filters 54 and 55 in FIG. 2 is already reflected in the digital output of ROM 66. Different ROMs for the sine and cosine modulated signals may also be used.

In embodiments of the invention where the SAW equalization filter is not combined with another filter (such as a Nyquist filter), the inverse impulse response of the SAW filter, or the inverse of the SAW filter's frequency response, $1/H_s(f)$, would define the characteristics of the equalization filter. In such a case, the Nyquist filter would be a separate filter. The equalization filter characteristics may be derived by methods other than using the SAW filter impulse response, or a portion of the impulse response, to predistort a signal. Also, the equalization filter may be placed downstream from the SAW filter to cancel out distortion from the SAW filter.

In the preferred embodiment, the SAW equalization filters are implemented as digital filters incorporating a ROM or a number of ROMs, such as described in U.S. Pat. No. 5,379,242, entitled "ROM Filter," by Dennis Rose and Daniel Fague, assigned to the present assignee and incorporated hereby reference. RAMs may be used instead of ROMs.

Figure 4:
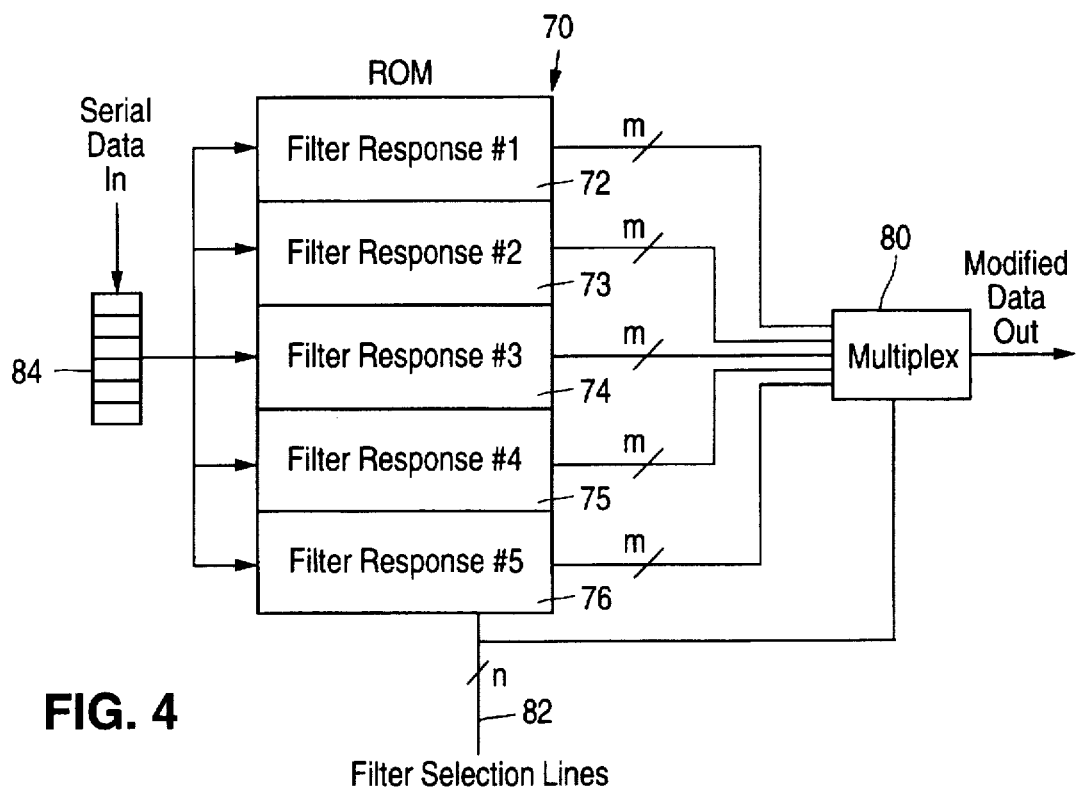
FIG. 4 illustrates an implementation of the digital filter using a ROM.

FIG. 4 illustrates a ROM 70 being used as a digital equalization filter for a SAW filter. The embodiment of FIG. 4 could also perform the function of the entire modem 64 shown in FIGS. 2 and 3 if the appropriate filter responses were stored in ROM 70. It will be assumed for illustration that the circuit of FIG. 4 performs the modem 64 function in FIGS. 2 and 3.

In FIG. 4, a ROM 70 includes a number of sections, which may also be separate ROMS, identified as ROMs 72 through 76. The filter responses to the various combinations of data symbols and clock bits applied to the ROM 70 address buffer(s) have been previously derived and stored in the appropriate addressable locations in ROM 70. Such filter responses may be obtained using the previously described convolution of the original baseband filter impulse response and the inverse of the SAW filter 30 impulse response to provide low pass filtering as well as equalization. Each of the ROMs 72–76 stores a filter response based upon a different SAW filter which may be used in the communication system. These various SAW filters may be those produced by different manufacturers which would normally be substituted for one another in a system. Or, these filters may have different bandpass filtering frequencies or other features which make them different from the other SAW filters.

The user of this modem 64 can then select, either by hardware or software selection means, which response will be used. Multiplexer 80 passes the selected filter response downstream for conversion to an analog signal. The user of the modem 64 will then run the modulated analog signal through his or her chosen SAW filter in the system. The advantage of this approach is that many filter responses can be stored in the ROM 70 filter, and the ROM size increases linearly with the number of responses. Die size will not increase linearly due to the structure of the preferred ROM filter. As in FIG. 3, the incoming data symbols along with clock bits (e.g., 4x or 8x oversample) are converted to parallel bits by register 84 and used to address the appropriate filter response. In one embodiment, all the ROMs 72–76 are addressed, and multiplexer 80 only passes the selected response downstream. Other multiplexing schemes may also be used.

Figure 5:
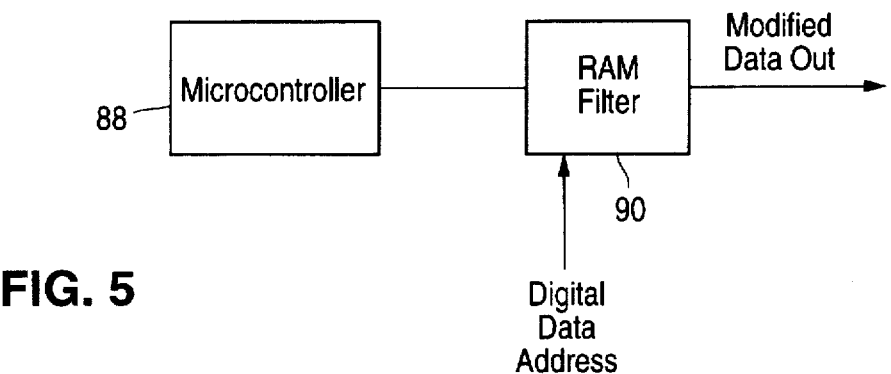
FIG. 5 illustrates an implementation of the digital filter using a microcontroller and RAM.

A second hardware implementation is shown in FIG. 5. In this implementation, a microcontroller 88, DSP chip, or other software programmable device is used to generate the predistorted filter response. This response is then downloaded to a RAM filter 90 that uses RAM in the place of ROM 70 to store the filter response. In this case, a single RAM filter 90 is necessary, since only one table of coefficients will be loaded. The advantage of this approach is that the user can generate a test routine in the manufacturing flow to sound the channel's impulse response, compute its inverse response, convolve that with the baseband filter's impulse response, and store the convolved result in the RAM filter 90. This approach allows the user maximum flexibility at the expense of die size, since RAM is larger than ROM, and at the expense of current consumption, since RAM consumes more current than ROM. These issues will be minimized as device dimensions evolve to smaller minimum sizes (i.e., 0.1 micron processes, etc.).

Alternatively, any conventional digital filtering techniques, including a software program, may also be used to implement a digital filter for equalizing the SAW filter 30 response.

In a test of an embodiment to equalize a SAW filter response using a digital filter, such as filter 54 in FIG. 2, it was shown that measured EVM is improved by almost 3.5 percentage points, is 2.7 times better than the unequalized system, and gives an EVM that is 37% of what it was in the unequalized system.

Figure 6:
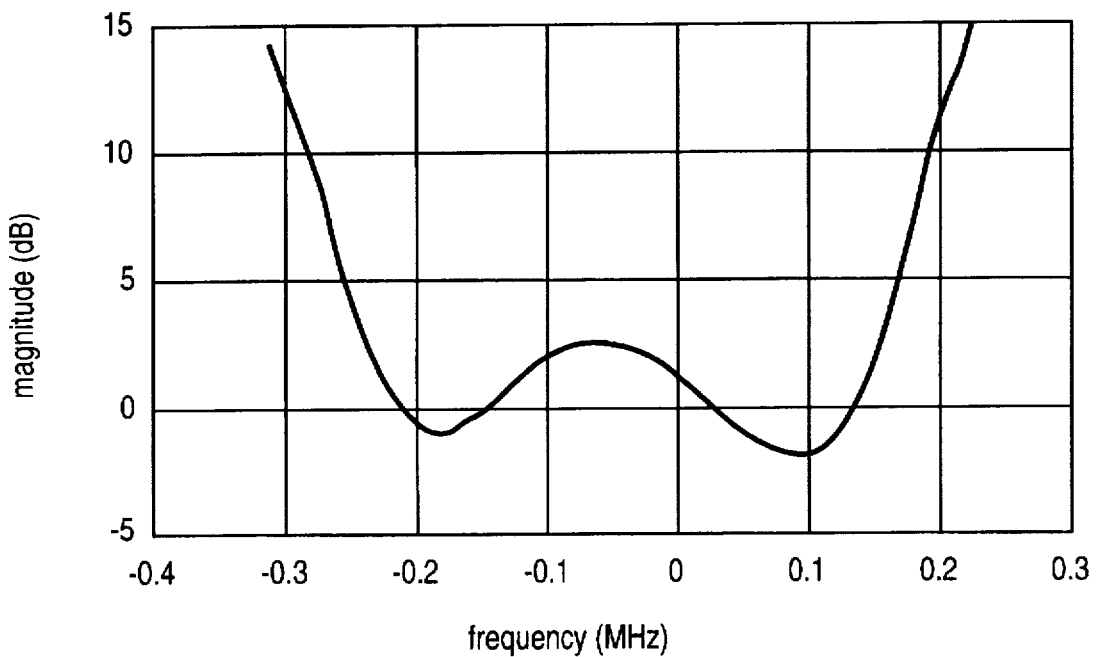
FIG. 6 illustrates the magnitude response of an equalizer filter used to pre-distort a signal before application to a SAW filter.
Figure 7:
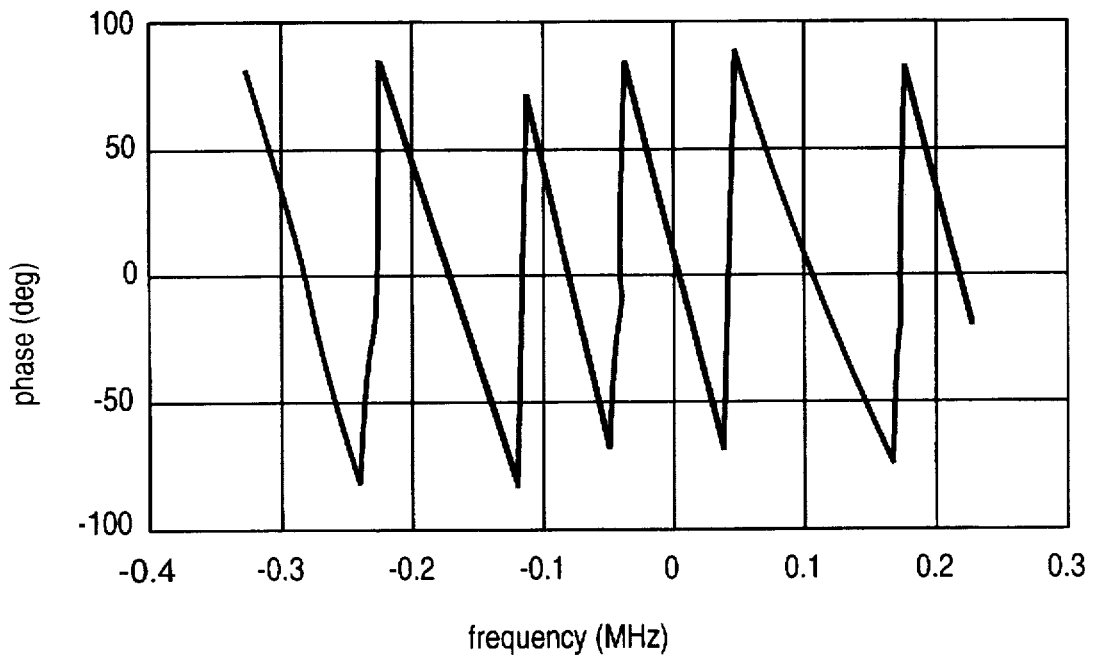
FIG. 7 illustrates the equalizer filter phase response.

FIG. 6 is an exemplary equalizer magnitude response, and FIG. 7 is an exemplary equalizer phase response, of an equalizer filter used in simulation for introducing predistortion into a data signal to compensate for distortion introduced by a SAW filter. No low pass filtering is performed by the equalizer filter having the response of FIGS. 6 and 7.

A novel, highly efficient, DQPSK modem which may substitute for modem 64 in FIG. 2 is described in U.S. Pat. No. 5,512,865, entitled "Digital Oversampled Quadrature Modulator," by Daniel Fague, filed herewith, incorporated herein by reference.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A circuit comprising:
   a surface acoustic wave (SAW) filter having an input terminal for receiving an analog signal for being filtered by said SAW filter, and having an output terminal for outputting a filtered signal; and
   at least one digital filter for receiving an original digital signal and outputting a filtered digital signal, said at least one digital filter introducing predistortion into said original digital signal, the filter response of said at least one digital filter being based, at least in part, on the filter response of said SAW filter such that distortion introduced by said SAW filter when filtering said analog signal is at least partially compensated by said predistortion introduced into said original digital signal by said at least one digital filter,
   said at least one digital filter being connected upstream from said SAW filter such that a modified digital signal is reflected in said analog signal filtered by said SAW filter.

2. The circuit of claim 1 wherein said at least one digital filter performs low pass filtering on said original digital signal as well as said predistortion of said original digital signal.

3. The circuit of claim 2 wherein filter response characteristics of said at least one digital filter are obtained by the convolution of an impulse response of a low pass filter with an inverse of an impulse response of said SAW filter.

4. The circuit of claim 3 wherein said convolution is performed in the frequency domain and converted into a filter response for said at least one digital filter.

5. The circuit of claim 1 further comprising a QPSK source generating I and Q data, said I and Q data being said original digital signal and being applied to one or more input terminals of said at least one digital filter.

6. The circuit of claim 5 wherein said QPSK source is a DQPSK source.

7. The circuit of claim 6 further comprising a modulator electrically connected to an output of said at least one digital filter for modulating said filtered digital signal by I and Q carrier frequencies.

8. The circuit of claim 1 wherein said at least one digital filter comprises a memory which is addressed, at least in part, by bits forming said original digital signal, said memory acting as a look-up table, and providing as an output said filtered digital signal.

9. The circuit of claim 8 wherein said memory provides low pass filtering of said original digital signal as well as said predistortion of said original digital signal.

10. The circuit of claim 8 wherein said memory is a ROM.

11. The circuit of claim 10 wherein said ROM comprises:
   a plurality of addressable sections, each section storing a different filter response.

12. The circuit of claim 11 wherein said ROM is controlled to provide a single filter response, based on a particular SAW filter used in said circuit, for subsequent processing and filtering by said particular SAW filter.

13. The circuit of claim 12 wherein said ROM includes a multiplexer for selecting said single filter response based on said particular SAW filter used in said circuit.

14. The circuit of claim 8 wherein said memory is a RAM providing a filter response based on a particular SAW filter used in said circuit.

15. The circuit of claim 1 further comprising:
   a digital-to-analog converter electrically connected to an output of said at least one digital filter for converting a digital signal into an analog signal; and
   a multiplier having one input connected to an output of said digital-to-analog converter and a second input connected to receive a local oscillator signal, said multiplier having an output connected to said input terminal of said SAW filter.

16. The circuit of claim 15 further comprising a modulator electrically connected to an output of said at least one digital filter, and having an output connected to an input of said digital-to-analog converter.

17. A method for processing a signal for being filtered by a SAW filter, said method comprising the steps of:
   generating an original digital signal;
   digitally filtering said original digital signal by at least one digital filter and outputting a filtered digital signal, said at least one digital filter introducing predistortion into said original digital signal, the filter response of said at least one digital filter being based, at least in part, on the filtering response of said SAW filter such that distortion introduced by said SAW filter is at least partially compensated by said predistortion introduced in said original digital signal by said at least one digital filter;
   converting said filtered digital signal into an analog signal; and
   filtering said analog signal by said SAW filter.

18. The method of claim 17 further comprising the step of modulating said filtered digital signal prior to said step of converting said filtered digital signal into said analog signal.

19. The method of claim 17 wherein said at least one digital filter performs low pass filtering on said original digital signal as well as said predistortion of said original digital signal.

20. The method of claim 19 wherein said step of generating comprises generating I and Q data by a QPSK source, said I and Q data being said original digital signal and being applied to one or more input terminals of said at least one digital filter.

21. The method of claim 20 wherein said QPSK source is a DQPSK source.

22. The method of claim 17 wherein said at least one digital filter comprises a memory, and said step of digitally filtering comprises addressing said memory, at least in part, by bits forming said original digital signal, said memory acting as a look-up table, and providing as an output said filtered digital signal.

23. The method of claim 22 wherein said memory provides low pass filtering of said original digital signal as well as said predistortion of said original digital signal.

24. The method of claim 22 wherein said memory is a ROM.

25. The method of claim 24 wherein said ROM comprises:

a plurality of addressable sections, each section storing a different filter response, said step of digitally filtering further comprising the step of controlling said ROM to provide a single filter response.

26. The method of claim 25 wherein said step of controlling said ROM comprises controlling a multiplexer for selecting said single filter response.

27. The method of claim 22 wherein said memory is a RAM providing a filter response.

* * * * *